United States Patent [19]
Jaroschek et al.

[11] Patent Number: 5,895,670
[45] Date of Patent: Apr. 20, 1999

[54] TWO-PLATEN INJECTION MOLDING MACHINE WITHOUT TIE BARS

[75] Inventors: Christoph Jaroschek, Endingen; Karl-Heinz Bourdon, Reute; Herbert Thoma, Kenzingen, all of Germany

[73] Assignee: Cincinnati Milacron Inc., Cincinnati, Ohio

[21] Appl. No.: 08/740,057

[22] Filed: Oct. 24, 1996

[30] Foreign Application Priority Data

Oct. 26, 1995 [DE] Germany .................. 195 39 752

[51] Int. Cl.$^6$ .................................. B29C 45/064
[52] U.S. Cl. ............... 425/589; 425/595; 425/451.9; 425/450.1; 425/451.3; 425/451.7
[58] Field of Search ................. 425/589, 451.9, 425/595, 450.1, 451.7, 451.3, 451.2

[56] References Cited

U.S. PATENT DOCUMENTS

| | | | |
|---|---|---|---|
| 2,319,479 | 5/1943 | Ryder | 425/451.9 |
| 4,018,150 | 4/1977 | Shiokawa | 100/231 |
| 4,424,015 | 1/1984 | Black et al. | 425/138 |
| 4,594,067 | 6/1986 | Langos | 425/451.9 |
| 4,693,679 | 9/1987 | Marth | 425/451.9 |
| 4,718,845 | 1/1988 | Sheffield et al. | 425/589 |
| 5,012,568 | 5/1991 | DiSimone et al. | 425/589 |
| 5,110,283 | 5/1992 | Bluml et al. | 425/589 |
| 5,135,385 | 8/1992 | Fukuzawa et al. | 425/595 |
| 5,266,874 | 11/1993 | Stillhard | 318/560 |
| 5,482,454 | 1/1996 | Miyahara et al. | 425/595 |
| 5,536,166 | 7/1996 | Schad | 425/589 |

FOREIGN PATENT DOCUMENTS

| | | | |
|---|---|---|---|
| 554068 | 8/1993 | European Pat. Off. | 425/451.9 |
| 1109356 | 6/1961 | Germany . | |
| 9417977 | 8/1994 | WIPO . | |

Primary Examiner—Jay H. Woo
Assistant Examiner—Robert Hopkins
Attorney, Agent, or Firm—Stephen H. Friskney

[57] ABSTRACT

A two-platen injection molding machine without tie bars has a platen fixed relative to the machine frame and a platen that moves relative to it, a traverse mechanism that operates the movable platen, a device for generating clamping force and a device to compensate for the deformation forces occurring during generation of the clamping force. The traverse mechanism and the device for generating clamping force are decoupled. Preferably, the device for generating clamping force has at least one connecting rod that passes through both the fixed and movable platens beneath the mold space. The connecting rod is detachably fastened to one of the platens and can be locked to the other platen by means of a clamping device that produces the clamping force. The device to compensate for the deformation forces includes at least one rigid spacer detachably fastened at one end to one platen, while the other end of the spacer is forced against the other platen.

7 Claims, 2 Drawing Sheets

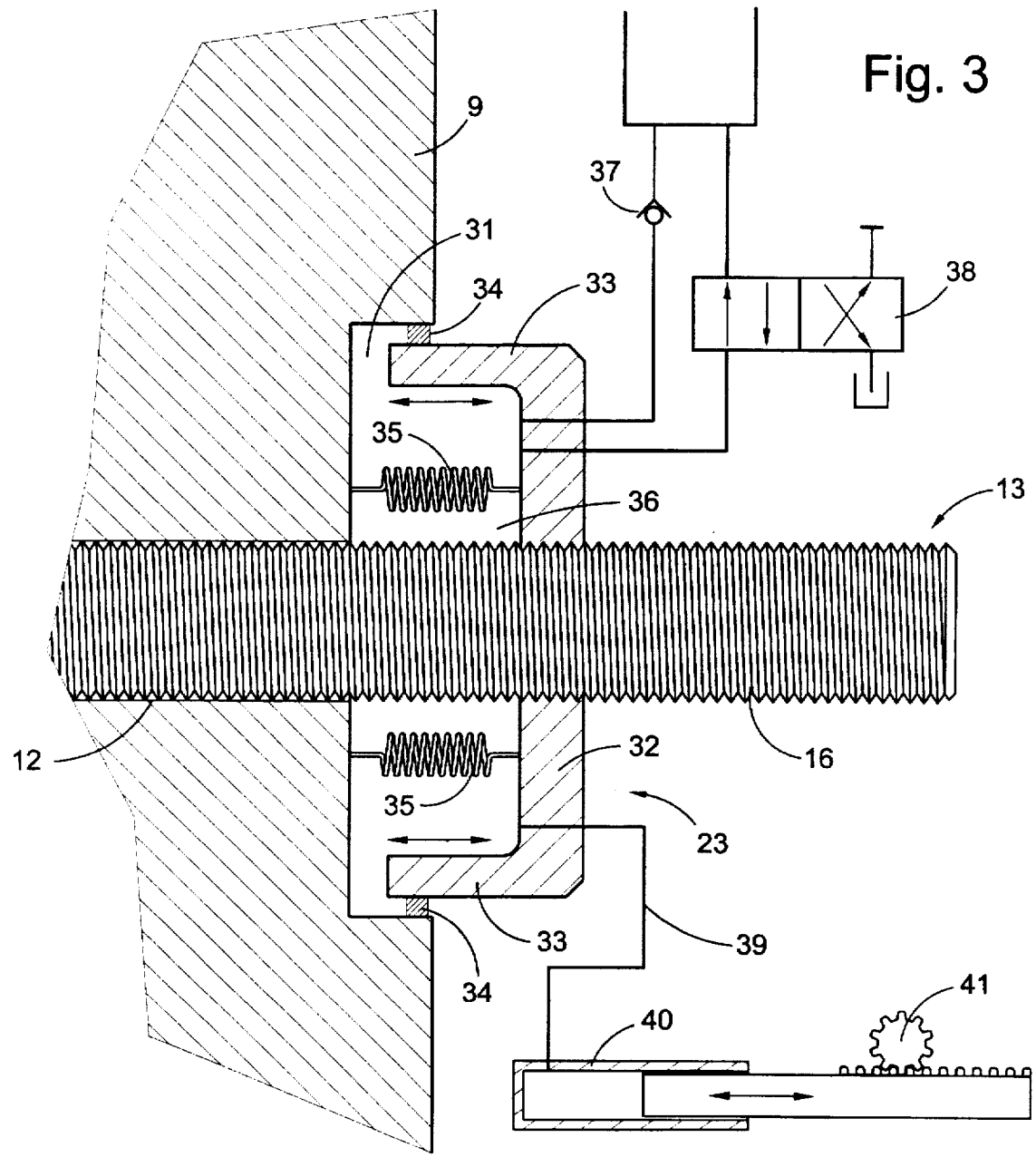

TWO-PLATEN INJECTION MOLDING MACHINE WITHOUT TIE BARS

BACKGROUND OF THE INVENTION

1. Field of Invention

The invention concerns a two-platen injection molding machine without tie bars, more particularly, an injection molding machine having a machine frame, a fixed platen, a movable platen, a drive mechanism that translates the movable platen, a device for generating clamping force on a closed mold, and a device to compensate for the deformation forces occurring during generation of the clamping force that would otherwise affect parallelism of the platens.

2. Description of the Related Art

In prior art injection molding machines, the fixed platen, also called the injection platen, is connected via tie bars in its four corner regions to an end platen, which is stationary during operation. The tie bars serve as a guide for a movable platen, which is driven relative to the fixed platen by means of a drive mechanism supported on the end platen. The tie bars together with the fixed platen and the end platen form a stable power transfer (clamp) mechanism that provides accurate guiding of the moveable platen and maintains parallelism between the mold mounting surfaces of the fixed and movable platens during mold closure. A drawback of such machines is that difficulties arise from the limited space between tie bars in the mold mounting region of the clamp mechanism that is encountered during installation or replacement of a mold. This is especially true for a large mold construction, which may have outwardly protruding hydraulic cylinders to operate sliding mold elements, etc.

To make the mold mounting region more accessible, injection molding machines without tie bars have been the focus of increasing development effort in recent years. In this type of injection molding machine, a C-shaped frame carries the aforementioned fixed platen and end platen, and generally serves to oppose the forces generated during the mold clamping function. Given the absence of tie bars to connect the platens, upward bending of the sections of the C-frame supporting the platens can occur during generation of the clamping force, so that the mold mounting surfaces of the platens are moved obliquely outward. In other words, due to this C-frame deflection when tonnage is applied to the mold, the platens and the mold elements mounted thereon are no longer parallel.

Some solutions have already been proposed in the prior art to compensate for this C-frame deflection. For example, platens are coupled to the C-frame so that they are guided independently of the frame, as by a pivoting connection. In prior art solutions, however, a relatively high cost is incurred to overcome the adverse effects. Another shortcoming of such machines is the large overall length and weight of the machines caused by the structure required to stabilize C-frame machines. For this reason, it has already been proposed in the prior art to produce two-platen injection molding machines without tie bars. A machine configured in this fashion is known, for example, from WO 94/17977, especially FIG. 7.

An injection molding machine is shown in WO 94/17977 in which the movable platen is arranged directly on the moveable end of the machine frame. Movement of the platen occurs via a hydraulic cylinder in which the piston rod is fastened on the inside of the fixed end of the machine frame, whereas the cylinder that guides the piston rod is positioned on the outside of the moving end of the frame.

The hydraulic cylinder-piston unit therefore has the dual tasks of bringing the mold halves together and applying the required clamping force to the closed mold. An additional hydraulic cylinder serves to compensate for the deformation forces occurring during generation of the clamping force that would otherwise affect parallelism of the platens. This second hydraulic cylinder is arranged beneath the drive cylinder. Both cylinders are fed separately. This variant of a two-platen injection molding machine has several shortcomings.

First, it should be mentioned that environmental protection is not adequately addressed by a purely hydraulic solution to drive the machine. A significant volume of hydraulic oil is required since both the traverse movement (demanding relatively little power) and the generation of clamping force must be produced by the same cylinder.

A second, related drawback is that a correspondingly large cylinder is required as a result of the dual tasks of the hydraulic cylinder, as described above, so that the machine weight is increased proportionately. Moreover, an unusually large amount of hydraulic fluid is moved even during traverse of the platen (which requires little power), resulting in a significant environmental hazard, given the leaks or line breaks that can occur during normal operation.

A third shortcoming of the hydraulic solution lies in the use of a hydraulic cylinder to compensate for frame deformation. Despite the relative incompressibility of hydraulic oil, hydraulic systems are inherently elastic so that a high force must be applied in the compensation cylinder to prevent deformation or keep it sufficiently small. These cylinders must therefore also be dimensioned relatively large.

SUMMARY OF THE INVENTION

The objective of the invention is to provide a two-platen injection molding machine without tie bars capable of maintaining parallelism of the platens during application of clamping force, in which the hydraulic system is minimized and the total machine weight is relatively low. The overall concept behind the invention proposes a machine with a short design length, free access to the mold space region, and a primarily mechanical or electrical drive concept.

The invention accomplishes the stated objective by decoupling the traverse mechanism from the mechanism that generates clamping force. The clamp mechanism (for generating force) has at least one connecting rod that passes through both the fixed and movable platens beneath the mold space, can be detachably fastened to one of the two platens, and is lockable on the other platen by means of a tightening device, thereby producing the clamping force. The machine further includes a device for compensating for the deformation forces in the form of a rigid spacer fastened detachably to one platen, so that it can be pressed against the opposing platen.

Since the invention provides that the mechanisms for movable platen traverse and generation of the clamping force are decoupled from each other, it is possible to adapt each of these two mechanisms individually to the associated task. Thus, the traverse mechanism can be relatively small, since the moved mass (movable platen) is not so large that a high starting moment would be necessary. In any case, a rapid traversing movement can be accomplished with this type of drive, which is not possible with the large hydraulic cylinders in the prior art, since these react too sluggishly. Similarly, the drive for the generating clamping force can also be designed relatively small, since it must apply the force for only a short stroke.

The clamping force is transferred from one platen to the other in a manner similar to WO 94/17977 (FIG. 7) via a connecting rod. However, according to the invention, the connecting rod is not the piston rod of a hydraulic cylinder connected to the platens, but instead passes through the two platens, is detachably fastened at one end to one of the platens, and is also detachably fastened at the opposite end to the other platen by means of a tightening device that creates the clamping force. Detachable fastening on both ends offers the advantage that the machine can be quickly adjusted to different mold heights, which is difficult in machines described in the prior art.

Combined with the connecting rods and clamping mechanism, is at least one rigid spacer detachably fastened to one platen, configured to press against the opposing platen to compensate for the deformation forces associated with the clamping force. This spacer is adapted in its effective length to the corresponding effective length of the connecting rod, i.e., to the corresponding mold height. It is configured so that the end of the spacer lies against the movable platen when the mold is closed. When the required clamping force has been generated by the clamping device so that a torque is produced on the platens around the attachment points of the connecting rods, the spacer exerts an equally large but opposite torque on the platens so that platen parallelism is maintained. In contrast to the prior art, the spacer of the invention is a rigid component which provides a simple solution from a design standpoint, but still avoids the drawback of system elasticity that occurs in the hydraulic cylinders of the prior art.

Preferably, the connecting rod has a shaft, which has an end region larger in diameter (similar to the head of a screw) to form a shoulder that abuts the clamping device. The connecting rod also has external threads on the opposite end region, which cooperate with the internal threads of a rod nut supported on the corresponding platen to provide detachable fastening. The clamping device is accordingly introduced between the other platen and the shoulder of the connecting rod.

The platen supporting the clamping device is provided with a passage or opening that is large enough in diameter to allow the end region (head) of the connecting rod to pass therethrough during opening and closing movement of the mold, i.e., during driving of the movable platen. When the platens are brought together to close the mold, a certain spacing remains between the shoulder of the head of the connecting rod and the outer surface of the platen, into which the clamping device is introduced. More specifically, the clamping device is designed so that it enlarges this spacing when activated to produce clamping force.

A clamping device consisting of two cooperating wedges is particularly suitable for this purpose. The wedges have recesses to provide clearance for the shaft of the connecting rod during entry of the wedges in the intermediate space between the shoulder and the platen. The surfaces of the wedges parallel to the direction of movement lie against the shoulder of the connecting rod end region and against the surface of the platen surrounding the passage opening for the connecting rod. The drive for the wedges can include hydraulic cylinders, but preferably cylinders that use limited hydraulic fluid volume in contrast to the prior art. The wedge tapers can be designed increasingly acute so that the force to be applied (given the short tightening path) can be relatively small, provided the length of the wedge is correspondingly large.

Attachment of the connecting rod to the opposing platen is accomplished by a treaded rod/nut connection. In addition to rapid replaceability of the connecting rod, this construction provides the advantage that the effective length can be rapidly adjusted to accommodate different mold heights. The rod nut can be directly connected to the platen, but can also be supported merely by application of the clamping pressure to the platen.

The rod nut is preferably designed as a housing open on one end, with the opposite end wall having a threaded opening to engage the external threads of the connecting rod. The side walls of the rod nut housing run parallel to the connecting rod axis. Within the housing are tightenable spring elements that connect between the platen and the end wall of the housing. The side walls of the housing can be inserted into a complementary recess in the platen with seals provided between the side walls of the housing on the adjacent wall of the recess, thus defining a volume around the connecting rod that can be filled with or emptied of a hydraulic fluid by suitable valving.

The spring elements are designed so that they pull the housing into the complementary recess. The pressure of the hydraulic fluid forced into the annular space counteracts the spring force. An additional clamping force component that moves the housing away from the platen against the force of the springs is produced by admission of hydraulic fluid into the annular space when the mold is closed and the clamping device tightened. At the end of the injection process, the annular space in the housing is depressurized, allowing the springs to pull the housing back toward the platen, moving the connecting rod in an axial direction, so that the clamping device can be opened without restriction. Thus, the spring-hydraulic fluid combination serves to avoid jamming of the clamping device and also assists in generating the required clamping force with the additional pressure buildup in the housing. Hydraulic fluid inflow and outflow for the housing occur via a distributing valve. The pressure required to generate additional clamping force can be generated by a separately drivable hydraulic piston/cylinder that forces additional hydraulic fluid, as required, into the annular hollow space in the housing.

Instead of the annular space sealed outward in the housing, at least one prefabricated pressure pad can be arranged in the housing. Thus, the pressure pad can also be supplied with additional hydraulic fluid from the outside, as in the preceding example of a hollow housing.

The rigid spacer is designed as a rotatable shaft with external threads for detachable fastening to the platen by means of mating internal threads in an opening in the platen through which the spacer shaft passes. In this configuration, the effective length of the spacer can be adjusted by simply rotating it, as may be required during a mold change and a consequent change in mold height. Preferably, both the connecting rod and the spacer are adjustable in effective length by a common drive for synchronous adjustment to the corresponding mold height. In this way it is possible to set both the connecting rod and spacer in their effective length with "one manipulation" when a new mold is incorporated. This drive is preferably an electric servomotor with an appropriate gear train that converts the rotation of the motor into synchronous rotation of the connecting rod and spacer.

The preferred drive mechanism for the movable platen consists of at least two opposed racks whose teeth face each other, in which one of the racks is attached to the machine frame and the other rack is attached to the movable platen. Two pinions are arranged in succession between the racks at constant spacing, are driven by an electric motor, and mesh with the teeth of the racks. Given that the motor and the pinions it drives form a sort of carriage which is moved along the lower rack by a distance "c", the upper rack is moved by distance 2c relative to the frame. In this fashion it is possible to accomplish a rapid traverse movement for the movable platen by simple means. In order for the two racks facing each other to always run parallel, the carriage can be equipped with guides that enclose the racks and guarantee constant spacing between the racks.

Although it is conceivable that the traverse mechanism, the device for generation of the clamping force and the device for compensation of deformation forces are arranged in the center longitudinal plane of the machine, it is preferred that these three elements consist of components arranged in mirror-image fashion relative to the longitudinal plane of the machine. This means that one connecting rod, one pair of racks and one spacer are provided on each side of the machine.

To reduce the weight of the machine, the fixed and platens each consist of a clamping region and two parallel supports for the clamping region that reach to the machine base, wherein both the connecting rod(s) and the spacer(s) cooperate with the supports. In contrast to the prior art, the platens do not extend to the machine base in table fashion so that weight is saved. The supports then have suitable passages for both the connecting rods and the spacers. In the preferred embodiment of the invention, the clamping device is positioned adjacent the movable platen, and the driven (threaded) ends of the connecting rod(s) and spacer(s) are associated with the fixed platen.

BRIEF DESCRIPTION OF THE DRAWINGS

FIG. 3 shows an enlarged, fragmentary view of detail A from FIG. 1.

DESCRIPTION OF THE PREFERRED EMBODIMENTS

Figure 1:
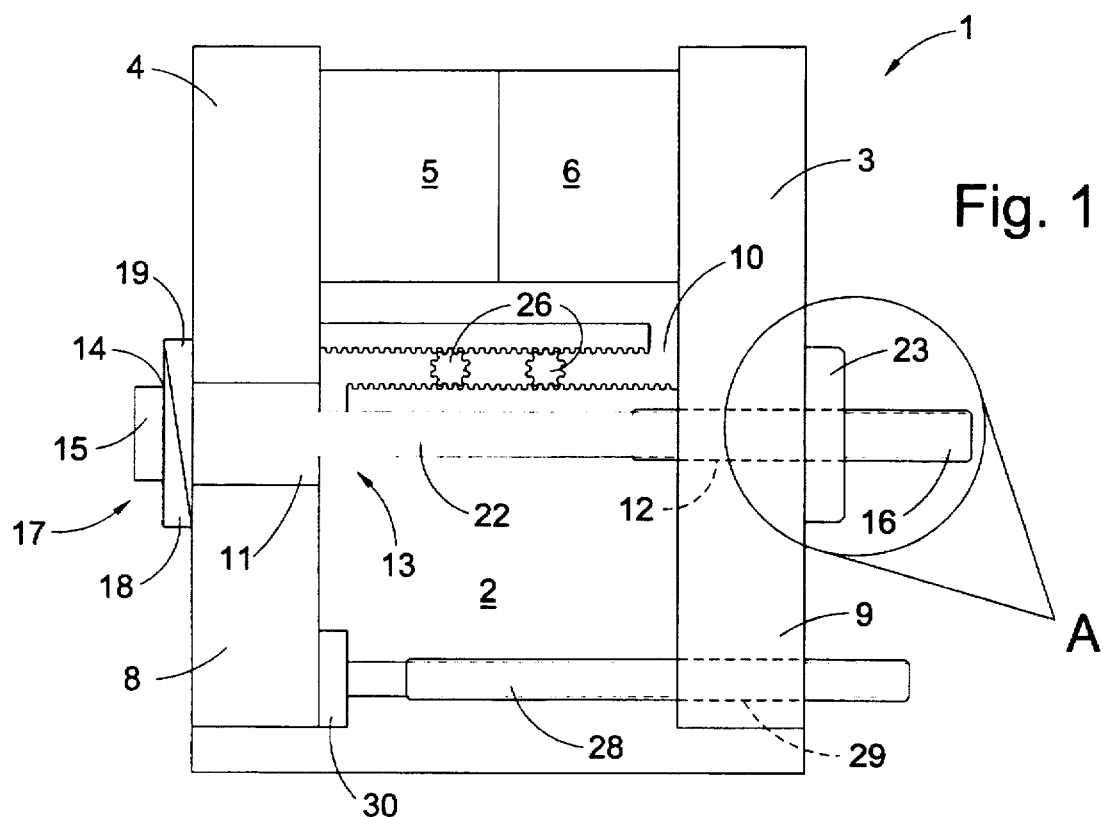
FIG. 1 schematically depicts in a side view an injection molding machine with a closed mold.
Figures 2A, 2B:
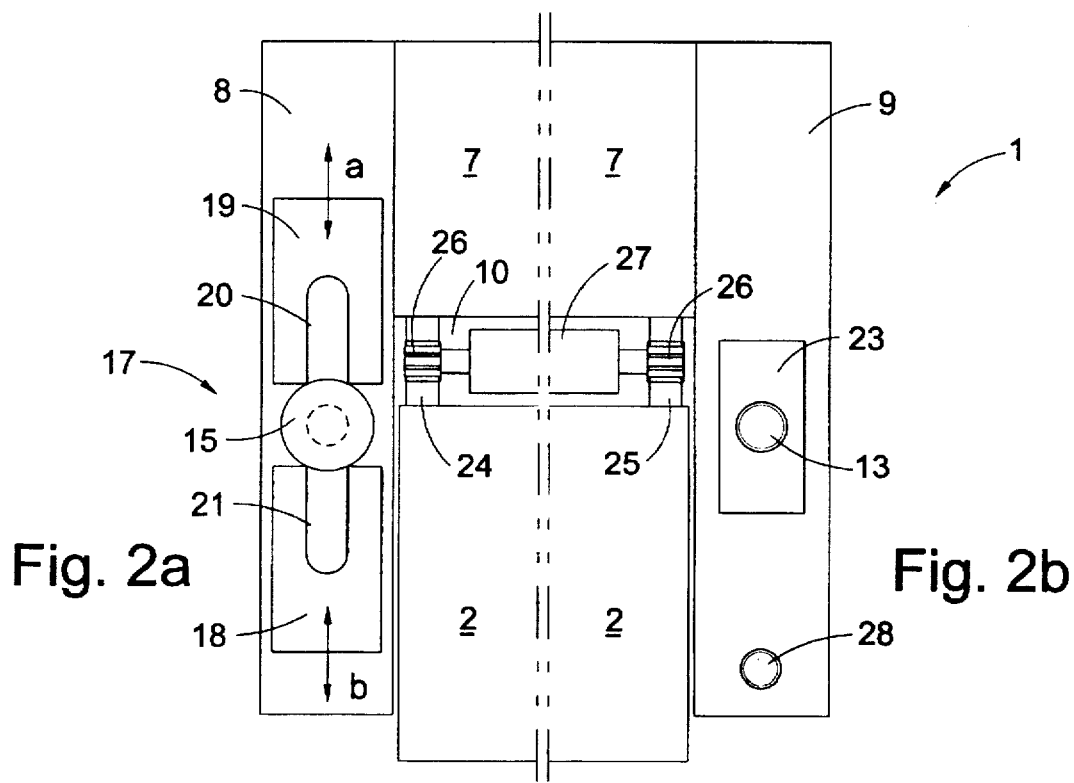
FIG. 2a shows a clamp (left) end view of the injection molding machine shown in FIG. 1.
FIG. 2b shows an injection (right) end view of the injection molding machine shown in FIG. 1.

A two-platen injection molding machine without tie bars, identified by reference number 1, is schematically depicted in FIGS. 1 and 2, leaving out the machine elements that are not essential for the invention. The machine primarily consists of a machine frame 2, a platen 3 fixed relative to machine frame 2, sometimes referred to as an injection platen, to which a plasticizing and injection unit (not shown) are connected, and a platen 4 that is movable relative to fixed platen 3, to which an ejector unit (not shown) is connected. One half 5 of a mold is attached to movable platen 4 and the other mold half 6 is attached to fixed platen 3. In FIG. 1 the machine 1 and mold halves 5, 6 are shown in the closed position.

As follows in particular from FIG. 2, the platens 3 and 4 are designed so that the actual clamping region 7 of each platen is supported by two parallel arranged supports 9 and 8, respectively, that extend to the machine base (not shown) adjacent the machine frame 2. Movable platen 4 is supported to slide on guides (not shown) provided on the machine base. This construction provides a free space 10 between the bottom edge of clamping region 7 and the top of machine frame 2. Passages 11 and 12, located at roughly the height of free space 10, are provided in platen supports 8 and 9, respectively.

Connecting rods 13 are arranged on each side of machine frame 2, received by the passages 11 and 12 of platens 4 and 3. The connecting rods 13 are designed similar to a screw bolt. The end region 15 corresponds to the screw head, and has a shoulder 14 adjacent the movable platen 4. The threaded portion 16 of the rods 13 forming a spindle is adjacent the fixed platen 3. Passage 11 in platen 4 is dimensioned so that the end 15 can pass therethrough during opening and closing of mold halves 5, 6.

A space, occupied by a clamping device 17, is provided between shoulder 14 of end region 15 and the opposite surface of support 8 when the mold halves 5, 6 are closed. The clamping device consists of two wedges 18 and 19 that can be moved one on the other along their oblique surfaces. As follows from FIG. 2, each of the wedges 18,19 have a recess 21 and 20, respectively, into which the shaft 22 of connecting rod 13 is accepted during the clamping movement of wedges 18 and 19. The parallel surfaces of wedges 18, 19 facing away from the slope are supported on one side by the shoulder 14 of head 15 and, on the other side, by the surface surrounding passage 11 on the surface of support 8. The drives for movement of wedges 18, 19 (in the direction of arrows a, b) that act perpendicular to the axis of shaft 22 are not shown. Appropriately designed hydraulic cylinders, as generally understood in the art, would provide the required driving force.

The shaft 22 of connecting rod 13 passes through the support 9 of the fixed platen 3. The external threads 16 of rod 13 cooperate with the internal threads of a rod nut 23 carried by support 9 of the fixed platen 3. The region of the machine 1 where these elements are located, is marked with a circle in FIG. 1 and identified by the reference symbol A, is shown in greater (enlarged) detail in FIG. 3 and is further described below.

The traverse mechanism for the movable platen 4 consists of two rack pairs 24, 25 arranged on both sides of the longitudinal center plane of the machine. Each rack pair 24, 25 consists of a first rack rigidly attached to the machine frame 2. The second rack is rigidly attached to the moveable platen 4 opposite the first rack, so that the teeth of the two racks face each other. Each pair of racks 24, 25 are positioned so that there is a constant spacing between the opposing racks. The teeth of two pinions 26, arranged in succession at constant spacing, mesh with the teeth of both racks of each rack pair 24, 25. The pinions 26 are driven synchronously by a motor, such as an electric motor 27, and are mounted so that they move relative to the machine base. The unit consisting of pinions 26 and motor 27 thus forms a sort of carriage, which can moved back and forth between the racks of the two rack pairs 24, 25. This means that during movement of this carriage along a distance "c", the movable platen 4 is moved by the distance "2c".

To offset the large torque that occurs on the platens 4, 3 around the attachment points of connecting rods 13 during generation of clamping force by the clamping device 17, which would otherwise adversely affect the parallelism of the platens, a spacer 28 is provided below the connecting rod 13 on each side of the molding machine 1. The spacer 28 is detachably fastened in the fixed platen 3 by a passage 29 having with internal threads, and has a head-shaped end region 30 positioned against the lower region of support 8. External threads on the shaft of spacer 28 cooperate with the internal threads in passage 29. The rotatable shaft design of both spacer 28 and connecting rod 13 has the advantage that the machine can be rapidly adjusted to the corresponding mold height during a mold change. For this purpose it is preferable, although not shown, for both the connecting rods 13 and the spacers 28 to have a common drive that rotates the connecting rods 13 and spacers 28 synchronously to adjust the effective length of these elements.

The configuration of connecting rod 13 and associated elements in platen 3 is shown in detail in FIG. 3. A recess 31 is milled into the surface of support 9 on the side facing away from mold half 6, around passage opening 12. The rod nut 23 is designed in the form of a housing, open toward recess 31, and having an opposite end wall 32 provided with a passage having internal threads to engage the external threads of the connecting rod 13. The side walls of the housing extend perpendicularly from the end wall 32 for a short distance into recess 31, wherein sealing elements 34 are arranged between the inside wall of recess 31 and the outer surface of side walls 33. Tension springs 35 that pull the rod nut 23 and thus also the connecting rod 13 in a direction toward support 9 are attached between support 9 and bottom 32 of rod nut 33 all the way around the connecting rod 13. This spring force is counteracted by the force generated by a pressure medium supplied to housing internal space 36. After application of the clamping force produced by the clamping device 17, the rod nut 23 is lifted somewhat from support 9 against the force of springs 35 by the pressure medium to further increase clamping force. At the end of the injection process, the pressure in the housing internal space 36 is diminished, allowing the springs 35 to pull the rod nut 23 back toward support 9. This causes the connecting rod 13 to also shift leftward by the same small spacing, allowing the clamping device 17 to be retracted more easily.

As shown in FIG. 3, supply (feed and emptying) of hydraulic medium occurs via a valve system 37, 38. Alternatively, hydraulic fluid can be forced into the housing internal chamber 36 in order to actively support clamping force generation by clamping device 17 via a feed line 39 connected to a rack-operated hydraulic cylinder 40 in which the rack is moved by a pinion 41 driven with an electric motor.

What is claimed is:

1. A two-platen injection molding machine without tie bars comprising:

a machine frame;

a fixed platen and a movable platen defining a mold space therebetween;

a traverse mechanism operating the movable platen;

a device for generating clamping force on achievement of mold closure, the clamping device being mounted on a surface of one of the platens outside of the mold space;

at least one connecting rod passing through both the fixed and movable platens beneath the mold space, the connecting rod comprising a shaft with one end configured to have a shoulder to engage the clamping device, such that the clamping device can be introduced between the platen and the shoulder of the connecting rod, the opposite end of the shaft having external threads that cooperate with internal threads of a rod nut mounted on the other platen to provide detachable connection of the rod to the other platen; and a device to compensate for the deformation forces occurring during generation of the clamping force, including at least one rigid spacer detachably connected to one platen and configured to press against the other platen;

wherein the traverse mechanism and the device for generating clamping force are decoupled.

2. The two-platen injection molding machine without tie bars according to claim 1, wherein the clamping device includes two wedges that can be moved one on the other along a line perpendicular to the connecting rod axis, such that movement of the wedges toward each other locks the connecting rod with respect to the associated platen and generates a clamping force acting on the shoulder of the connecting rod and the adjacent surface of the platen.

3. The two-platen injection molding machine without tie bars according to claim 1, wherein the rod nut is designed as a housing open on one end, having an opposite end wall provided with an opening having internal threads to engage the external threads of the connecting rod, side walls that run parallel to the connecting rod axis toward the platen, and prestressable spring elements arranged in the housing that act on the platen and on the housing end wall to move the connecting rod when clamping force is removed, wherein the side walls of the housing are received by a conforming recess in the platen and seals are provided between the side walls of the housing and corresponding interior walls of the recess, the housing and recess together forming a space into which hydraulic fluid can be admitted via valves.

4. The two-platen injection molding machine without tie bars according to claim 1, wherein the spacer includes a rotatable shaft for detachable fastening to the platen, the shaft having external threads that cooperate with the internal threads of an opening provided in the platen for passage of the spacer shaft.

5. The two-platen injection molding machine without tie bars according to claim 4, wherein both the connecting rod and the spacer are adjusted in effective length by rotation via a common drive for synchronous adjustment to the corresponding mold height.

6. The two-platen injection molding machine without tie bars according to claim 5, wherein the common drive includes an electric servomotor and appropriate gear train.

7. The two-platen injection molding machine without tie bars according to claim 1, wherein the traverse mechanism includes at least two opposed racks having teeth that face each other, one of the racks being attached to the machine frame and the other rack attached to the movable platen; and two pinions arranged in succession in between the racks at constant spacing; wherein the pinions are driven by an electric motor and mesh with the teeth of the racks.

* * * * *